April 13, 1926.
E. PAMPERL
1,580,674
TERM CONTROLLING APPARATUS FOR ESTABLISHMENTS FOR INDICATING
THE DEGREE OF OCCUPATION AND THE PROGRESS OF WORK
Filed Nov. 19, 1925 2 Sheets-Sheet 1
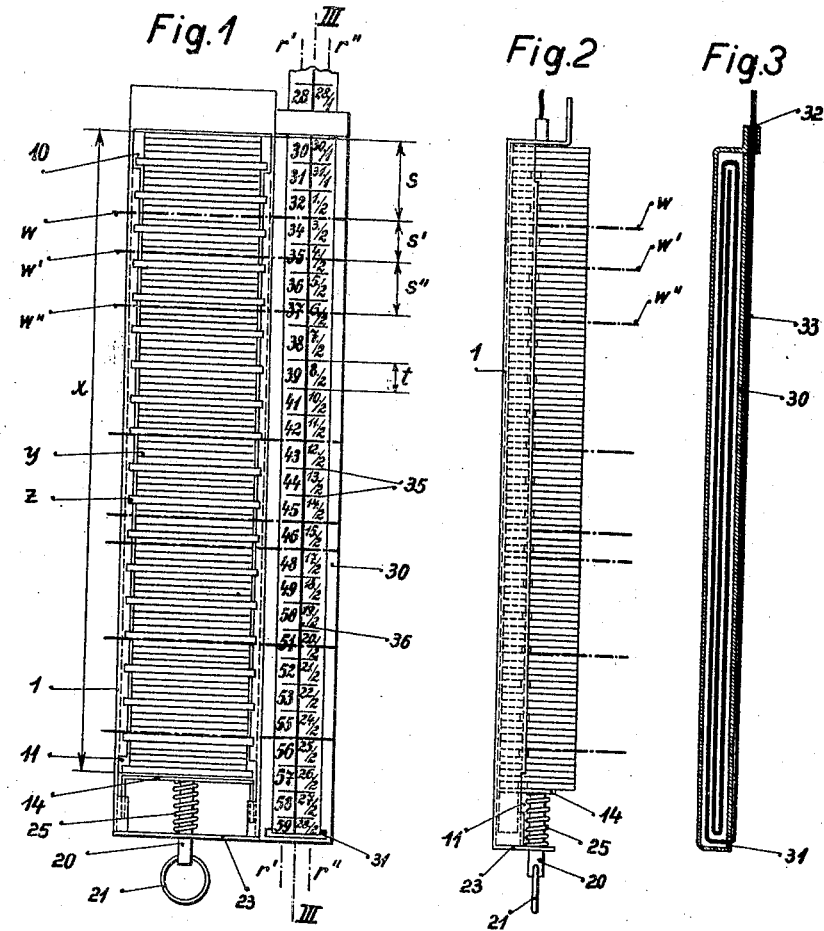
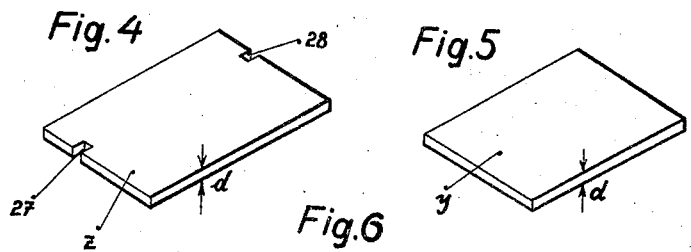
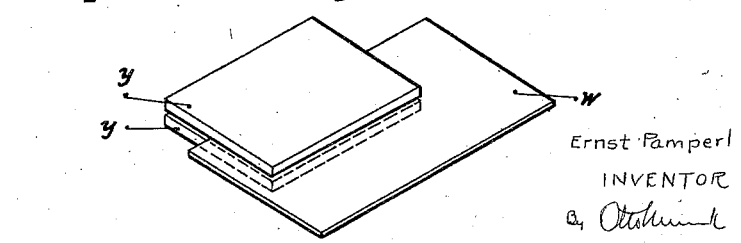
Ernst Pamperl
INVENTOR
his ATTY.

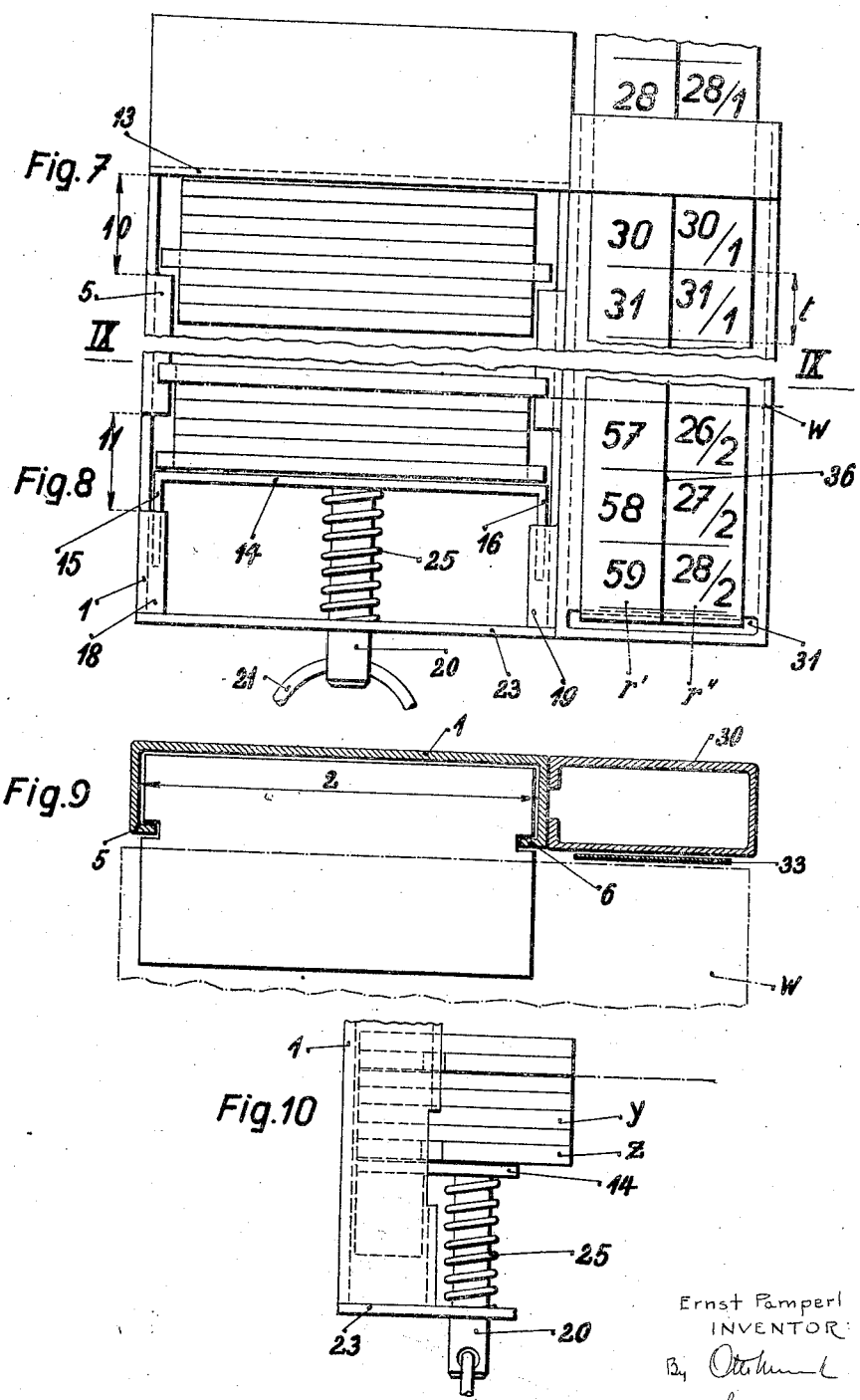

Patented Apr. 13, 1926.

1,580,674

UNITED STATES PATENT OFFICE.

ERNST PAMPERL, OF WEIZ, AUSTRIA.

TERM-CONTROLLING APPARATUS FOR ESTABLISHMENTS FOR INDICATING THE DEGREE OF OCCUPATION AND THE PROGRESS OF WORK.

Application filed November 19, 1925. Serial No. 70,202.

*To all whom it may concern:*

Be it known that I, ERNST PAMPERL, engineer, subject of the Republic of Austria, residing at Weiz, Styria, Republic of Austria, have invented certain new and useful improvements in term-controlling apparatus for establishments for indicating the degree of occupation and the progress of work, of which the following is a specification.

In the economical management of industrial establishments the methodical distribution of work and the fixing of terms or times plays an important part. The fixing of terms requires an exact knowledge of the degree of occupation at any given time. The best known method used for securing a view is the graphical representation in its various forms. For indicating the degree of occupation and the progress of work heretofore various control systems and control apparatus have been proposed. The frequent regroupings necessitated by recording orders require however a ready movableness of the means which the apparatus known heretofore does not possess.

The object of the present invention is to provide an apparatus satisfying the various practical requirements above referred to which is simple in construction and easy to handle. This is secured according to the invention that the apparatus comprises a pile of distance pieces loosely arranged in a series for inserting indicating means into the pile and a scale divided in other units (for instance time units) on which the thickness of the distance pieces between the indicating means may be read as time units (for instance hours).

In the drawing a constructional form of the term controlling apparatus is shown by way of example. Fig. 1 shows the control apparatus in front elevation and Fig. 2 in side elevation. In Fig. 3 a longitudinal section on the line III—III Fig. 1 is shown. Figs. 4 and 5 show in perspective view two forms of distance pieces and Fig. 6 the arrangement of the indicating means between to distance pieces. In Fig. 7 the top part and in Fig. 8 the bottom part of the control apparatus is shown in front elevation on a larger scale. Fig. 9 is a transverse section on the line IX—IX, Fig. 8, and Fig. 10 is a side elevation of Fig. 8.

The control apparatus comprises a pile $x$ of distance pieces $y$, $z$ arranged loosely the one above the other, or side by side, which serves for inserting indicating means or markers $w$, $w'$, $w''$ between the distance pieces. Preferably the order forms may be used as markers. The distance pieces $y$, $z$ consist of plates equal in thickness (Figs. 4 and 5). These plates are interchangeably and movably arranged in a carrier 1, which is for instance made of sheet metal and is provided with a trough 2 (Fig. 9) open at its front side, which serves for receiving the plates $y$, $z$. The trough is provided with inturned guide ribs, 5, 6. The guide ribs 5, 6 are provided with recesses 10, 11 at the top and bottom ends of the trough, which recesses serve for more readily inserting and removing the plates $y$, $z$. The trough 2 is closed on top by a fixed plate 13 and at the bottom by a slide 14. The slide 14 rests slidably by lateral guide lugs 15, 16 in guide grooves 18, 19 which for instance may be formed by the downwardly extended guide ribs 5, 6. On the slide 14 a stud 20 is secured, which serves for taking hold of the slide and for actuating the same. For this purpose the stud is provided with a ring 21. The stud 20 passes through the fixed bottom wall 23 of the trough 2. Between the bottom wall 23 and the slide 14 a coiled spring 25 is interposed, which forces upwards the entire pile of distance pieces.

As is shown in Figs. 4 and 5 the pile consists of two kinds of distance pieces $y$, $z$. The distance pieces $y$ are rectangular in shape; their length is somewhat less than the distance between the two inner edges of the guide ribs 5, 6 so that these distance pieces may be inserted into and removed from the trough at any point of the pile. Between groups of a predetermined number of distance pieces $y$, for instance groups of five, the distance pieces $z$ are interposed in the pile. These plates are somewhat longer and provided with slots 27, 28 at their side edges, which slots receive the guide ribs 5, 6. The larger distance pieces $z$ serve for facilitating the reading of the hours of working time represented by the distance pieces. Besides the guided distance pieces $z$ prevent the distance pieces $y$ from falling out.

To one side of the casing 1 an extension 30 is secured, which in the example shown is box shaped in transverse section. The extension 30 is provided with a slot 31 at its bottom and with a slot 32 at its top.

Through these slots passes a strip or band in the manner illustrated in Figs. 3 and 7. The strip 33 is movable longitudinally and provided with a scale which is formed by division lines 34, parallel to the contacting faces of the superposed distance pieces $y$, $z$. Furthermore the scale is divided by a longitudinal line 36 into two columns $r'$, $r''$ of fields. On the fields of the column $r'$ the successive working days of a period of time, for instance of a year, are indicated for the purpose of facilitating the reckoning of the number of days designed for working. On the fields of column $r''$ the dates of successive working days are indicated. The distance $t$ between two successive division lines 35 correspond to a multiple of the thickness $d$ of a distance piece or plate. In the example shown the distance $t$ is four times the thickness $d$.

The successive numbers of the column $r'$ and the successive date indications of the column $r''$ begin at the upper end of the scale strip 33. The box like shape of the extension 30 serves for receiving the part of the scale strip not yet in use.

The operation of the above apparatus is the following.

The markers $w$, $w'$, $w''$ and so on, for instance the order forms filled out for the works in hand are inserted between the distance plates $y$, $z$ in such distances $s$, $s'$, $s''$ and so on, that the distances $s$, $s'$, $s''$ between the uppermost marker $w$ and the plate 13 or between the successive markers $w'$, $w''$ and so on correspond to the working times. One begins at the top end of the pile $x$ and inserts the markers $w$, $w'$, $w''$ in succession as required by the urgency of the works ordered between the distance plates $y$, $z$ (Fig. 6) the thickness $d$ of the distance plates being equal to a fraction of the scale division and each distance plate corresponding to a unit of time, for instance two hours. The markers $w$ indicate on the scale the total duration of occupation for each work as well as the presumable terms of finishing each individual work. Referring to Fig. 1 and assuming that each distance plate corresponds to a working time of two hours and therefore each scale division $t$ corresponds to a working time of eight hours, the work indicated by the uppermost marker $w$ is the most urgent one and requires three working days of eight hours each, that is to say the sum of 24 working hours. The work ordered by the next marker $w'$ requires for instance a working time of 1½ days, that is to say 12 hours; this is exactly indicated by the scale. The work ordered by the next marker $w''$ requires for instance 16 hours, which can be likewise exactly read on the scale. Moreover the individual markers also indicate the term. If for instance the work ordered by the marker $w$ is commenced in the first working hour of January 30th it can be read on the scale that this work is finished at the end of February 1st.

At the end of each working day or at the beginning of the next day the date strip is moved forwards to the same extent as the time advances, so that on reading the date of the running days is always at the top end. When the first work is finished the marker indicating the same is removed together with the corresponding distance plates. As the other distance plates and markers move upwards the next marker $w'$ reaches the first place.

The present apparatus also provides for incoming urgent works. If such a work has to be interposed the distance plates are separated at the desired point and as many spare distance plates are interposed at this point as may correspond to the working time required. Also when works have to be postponed the markers together with the corresponding distance plates are removed and the part of the pile below them may be pushed upwards. Preferably on the markers $w$, $w'$, $w''$ the final terms when the work must be finished may be indicated. This provides for the possibility of ascertaining by reading the scale any transgression of terms or any accumulation of works.

If the excess of occupation of an establishment is only a temporary one, this can be compensated for by arranging for extra working hours. If the excess of occupation is a permanent one, for instance in times of increasing business, this excess of occupation may necessitate second shifts. This results in that the orders may be disposed of in half the time. This change too may be made visible in the control apparatus by substituting for the normal scale strip 33 a strip having a division $t$ twice as great.

The present control apparatus is suitable for establishments of all kinds. Owing to its simple construction it is cheap and may be easily handled. The control apparatus above described is only one of the many possible embodiments of the invention and the apparatus may be varied within the scope of the invention set forth.

For instance, instead of using the scale strip certain distance plates might be provided with indications relating to the control quantity, for instance time. But the distance plates so marked likewise constitute a scale for determining the thickness for the distance pieces located between the markers.

What I claim is:

1. In an apparatus of the type set forth the combination of a carrier, a plurality of distance pieces loosely arranged and constituting a pile in such carrier, markers adapted to be inserted between adjacent distance pieces of the pile and a scale adapted to indicate the total thickness of the distance pieces between any two markers.

2. In an apparatus of the type set forth the combination of a carrier, a plurality of distance pieces loosely arranged in contact with each other and constituting a pile in such carrier, markers adapted to be inserted between adjacent distance pieces of the pile and a scale adapted to indicate the total thickness of the distance pieces between any two markers, the said distance pieces being in the shape of plates equal in thickness, this thickness being a fraction of the distance between two successive division lines of the scale.

3. In an apparatus of the type set forth the combination of a carrier, a plurality of distance pieces loosely arranged in contact with each other constituting a pile in such carrier, markers adapted to be inserted between adjacent distance pieces of the pile and a scale adapted to indicate the total thickness of the distance pieces between any two markers, the said distance pieces being interchangeably and removably attached to the said carrier.

4. In an apparatus of the type set forth the combination of a carrier, forming an open trough provided with guide ribs, a plurality of distance pieces arranged in contact with each other and constituting a pile in such carrier, markers adapted to be inserted between adjacent distance pieces of the pile and a scale adapted to indicate the total thickness of the distance pieces between any two markers.

5. In an apparatus of the type set forth the combination of a carrier, forming an open trough provided with guide ribs, having recesses at their top and bottom ends, a plurality of distance pieces loosely arranged in contact with each other and constituting a pile in such carrier the said distance pieces being adapted to pass through the said recesses in the guide ribs, markers adapted to be inserted between adjacent distance pieces of the pile and a scale adapted to indicate the total thickness of the distance pieces between any two markers.

6. In an apparatus of the type set forth the combination of a carrier, a plurality of distance pieces loosely arranged in contact with each other and constituting a pile in such carrier, markers adapted to be inserted between adjacent distance pieces of the pile, and a scale adapted to indicate the total thickness of the distance pieces between any two markers and a pressing device, adapted to press the distance pieces against each other.

7. In an apparatus of the type set forth the combination of carrier, a plurality of distance pieces loosely arranged in contact with each other and constituting a pile in such carrier, markers adapted to be inserted between adjacent distance pieces of the pile and a scale adapted to indicate the total thickness of distance pieces between any two markers, the said scale being adjustable longitudinally relatively to the pile.

8. In an apparatus of the type set forth the combination of a carrier, a plurality of distance pieces loosely arranged in contact with each other and constituting a pile in such carrier, markers adapted to be inserted between adjacent distance pieces of the pile and a scale adapted to indicate the total thickness of the distance pieces between any two markers, the said scale being arranged on a strip adapted to slide in guides stationary relatively to the said carrier.

9. In an apparatus of the type set forth the combination of a carrier, a plurality of distance pieces loosely arranged in contact with each other and constituting a pile in such carrier, markers adapted to be inserted between adjacent-distance pieces of the pile and a scale adapted to indicate the total thickness of the distance pieces between any two markers, a lateral extension on the said carrier, guides on the said extension and a strip slidable along such guides and having arranged on it the scale.

10. In an apparatus of the type set forth the combintion of a carrier, a plurality of distance pieces loosely arranged in contact with each other and constituting a pile in such carrier, markers adapted to be inserted between adjacent distance pieces of the pile and a scale adapted to indicate the total thickness of the distance pieces between any two markers, a lateral hollow extension on the said carrier, guides on the said extension and a strip slidable along such guides and having arranged on it the scale, the said hollow extension being adapted to receive the part of the said scale carrying strip not in use.

11. In an apparatus of the type set forth the combination of a carrier, forming an open trough provided with guide ribs, a plurality of distance pieces loosely arranged in contact with each other and constituting a pile in such carrier, some of the said distance pieces, being provided with lateral slots adapted to engage with the said guide ribs, markers adapted to be inserted between adjacent distance pieces of the pile and a scale adapted to indicate the total thickness of the distance pieces between any two markers.

In testimony whereof I affix my signature.

ERNST PAMPERL.